United States Patent [19]
Smith

[11] Patent Number: 4,927,274
[45] Date of Patent: May 22, 1990

[54] SLIP RING AIR BEARING

[76] Inventor: Robert S. Smith, 1263 Emory St., San Jose, Calif. 95126

[21] Appl. No.: 370,607

[22] Filed: Jun. 23, 1989

[51] Int. Cl.$^5$ ............................................. F16C 21/00
[52] U.S. Cl. ................................... 384/101; 384/102; 384/126; 384/624
[58] Field of Search ............................... 384/100-102, 384/114, 126, 624

[56] References Cited
U.S. PATENT DOCUMENTS

| | | | |
|---|---|---|---|
| 3,305,280 | 2/1967 | Peterson | 384/126 |
| 3,491,529 | 1/1970 | Kerr et al. | 384/100 X |
| 3,642,331 | 2/1972 | Silver | 384/102 |
| 3,751,044 | 8/1973 | Sawada | 384/101 X |
| 3,854,781 | 12/1974 | Bildtsén | 384/102 |

FOREIGN PATENT DOCUMENTS

| | | | |
|---|---|---|---|
| 2359389 | 6/1975 | Fed. Rep. of Germany | 384/624 |
| 1287595 | 2/1962 | France | 384/114 |

Primary Examiner—Thomas R. Hannon
Attorney, Agent, or Firm—Robert Samuel Smith

[57] ABSTRACT

A compound journal airbearing having a sleeve concentric with a rotor and having an inner surface forming an airbearing space with the surface of the rotor so as to maintain the rotor surface and inner sleeve surface out of contact. The sleeve is supported at each end by the inner race of a bearing whose outer periphery is supported by contact with the interior surface of the stator housing. Pressurized air is supplied to the airbearing space by a passage leading from an air supply through the wall of the stator and sleeve to the airbearing space. The airbearing surface can be shaped to provide both radial and axial support. For this purpose, the airbearing surfaces may be either concave or convex toward the axis of the rotor. Catastrophic failure that would occur with construction of the prior art due to inadvertent contact of rotor and stator surfaces (collapse of the airbearing film) is avoided because the sleeve is able to turn when inadvertent touchdown occurs.

7 Claims, 2 Drawing Sheets

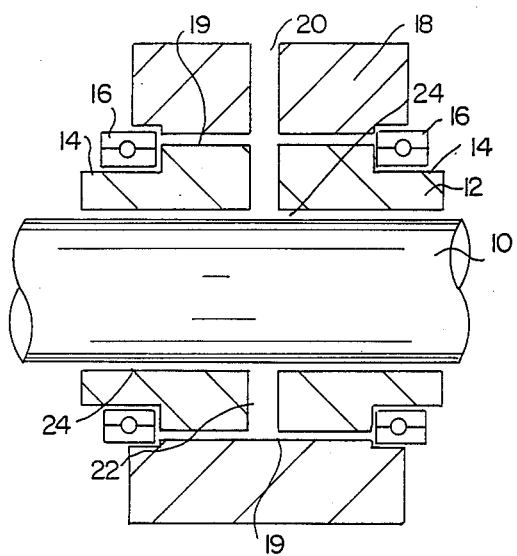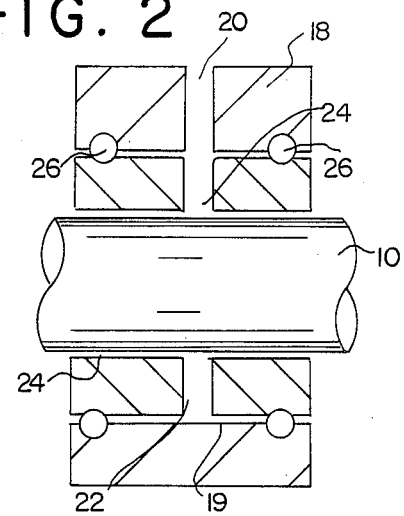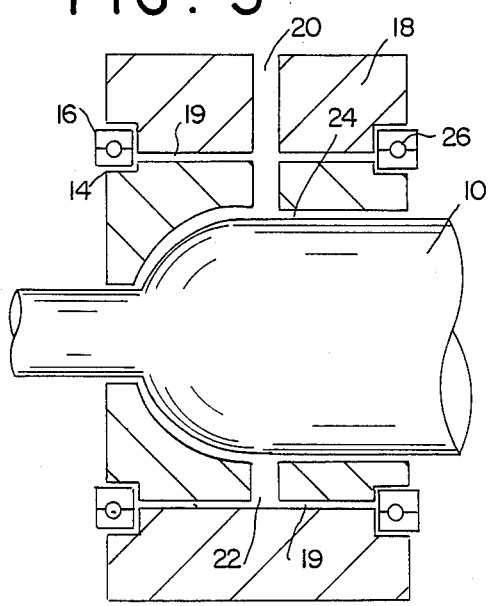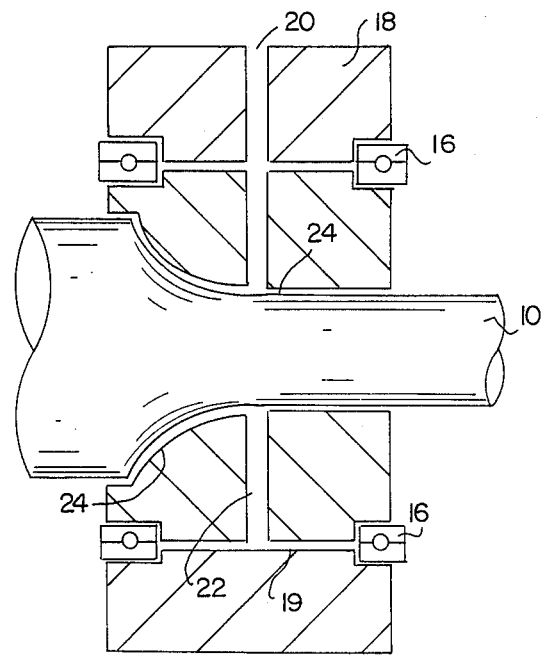

SLIP RING AIR BEARING

BACKGROUND

1. Field of the Invention:

This invention is related to journal air bearings and in particular to an air bearing having a slip ring construction that minimizes the problem of galling between the air bearing surfaces.

2. Prior Art:

Journal air bearings are bearings comprising a cylindrical rotor enclosed by a stator (or housing) in which the surface of the rotor is supported out of contact with the interior surface of the stator by a pressurized air film. The air film is the lubricant for the bearing and therefore a major advantage of this construction is the low frictional loss that is associated with the bearing. A second advantage is the minimal transmission of vibration from the stator to the rotor. Journal air bearings are therefore used in applications where elimination of vibration is very important such as to support the spindles of latches or grinders used to manufacture substrates for memory disks. Journal air bearings may be designed to support the rotor in both the radial and axial directions. Axial support is provided by a flange on each end of the rotor that is parallel and in close proximity to a stationary flange on each end of the stator. The interface between the rotor and stator flanges is an airbearing space, wherein pressurized air is supplied through a passage leading from a source of pressurized air, through the wall of the stator and opening into the airbearing region. Other constructions are also used to provide greater support depending on the application. These constructions include spherical interfaces which in one case is convex toward the axis of the bearing and in another case is concave toward the axis of the bearing. In another construction, the rotor is tapered.

The performance of any air bearing depends on the distribution of pressure and pressure gradients in the air bearing space. These distribution patterns are established by shallow grooves in the surface of the stator bounding the air bearing space and lead from the proximity to the entry of the air passage into the airbearing space to various areas of the interface.

For a detailed discussion of the prior art, reference is made to "Hydrostatic and Hybrid Bearing Design" by W. B. Rowe, published by Butterworth & Co., Univ. Press, and available in the Library of Congress, TJ1073.5.R69 1983.

A major problem with journal air bearings is their susceptibility to "crashes". A "crash" is the term applied to a situation where, for one of a number of reasons, oftentimes a speck of dirt, momentary contact between the airbearing surfaces occur leading to collapse of the air film, severe galling of the two surfaces moving in frictional contact with one another and sudden "freezing" of the rotor. When a crash occurs, the rotor must be removed from the stator, the surfaces lapped and polished, and the bearing reassembled. Usually the lapping must be performed by the manufacturer of the air bearing so that considerable time and effort is expended.

The traditional approach to avoiding crashes has been to pump very clean (filtered) air through the air bearing. Filters are normally designed to prevent only a fraction of particles larger than a given value from passing. Therefore the problem persists because it is virtually impossible to prevent particles from eventually passing through the filtering system into the air-bearing space.

In order to minimize the damage due to the crashes, airbearing surfaces are made that are very hard. Surfaces that are used are "hard anodized" aluminum, and nitrided (case) hardened steel. The problem here is that preparation of these surfaces is costly and critical. Furthermore, when crashes occur involving these surfaces, the relapping that is necessary often "breaks through" the hardened surface layer and the parts must be retreated or discarded.

Another approach to minimize damage due to a crash has been to install a relatively expensive braking system that stops the rotation within a period of one revolution of the beginning of a crash. The latter remedy is obviously not effective by definition.

THE INVENTION

OBJECTS:

It is an object of this invention to provide a journal air bearing whose construction prevents "crashing".

It is a further object that intermittent touching of the air bearing surfaces of this construction will not lead to the crashes and galling of the airbearing surfaces.

It is another object of this invention to incorporate a versatile character to the construction of the bearing that avoids the expense of reconstruction and repair of crashed air bearings such as are required by the constructions of the prior art.

SUMMARY:

This invention is directed toward a journal air bearing having a sleeve that encloses a rotor wherein the adjacent surfaces of rotor and sleeve are maintained out of contact by an airbearing film and the sleeve is supported in a housing that permits the sleeve to turn when there is the slightest rotational drag on the sleeve such as might occur with intermittent contact of the sleeve and rotor.

In one embodiment, the sleeve is supported at each end by the inner race of a bearing which is supported in turn at its periphery by contact with the interior surface of a (stator) housing. A passage through the housing supplies pressurized air to the air bearing area.

In another embodiment, the sleeve is supported within the cylindrical cavity of the housing by an "0" ring on each end of the sleeve. In this construction, lubricant may be supplied to the interface between the adjacent surfaces of the sleeve and interior surface of the housing.

For some applications, axial support of the bearing is presented by constructions at the end of the rotor that are unassociated with the bearing. In such situations, a sleeve having a cylindrical interior surface may be used. However, other shapes of the sleeve may be used to provide axial support. For example, the airbearing surface may be either concave or convex toward the axis of the rotor.

Since the airbearing surfaces are out of contact with one another and since the drag on touchdown results in negligible damage, materials having properties that occur in a wide range can be used to construct the rotor, sleeve and stator. For example, a preferred surface for the cylindrical interior of the housing is a hardened surface such as nitrided steel or hard anodized aluminum. Hard anodized aluminum has a naturally occurring porous surface that can be impregnated with agents such as TEFLON plastic (fluorocarbon) so as to substantially reduce the coefficient of friction of the surface. The rotor may be made of a similar material.

The sleeve may be made of a material that has a low coefficient of friction and resists damage from adhesive wear that can occur from incidental contact by the rotor. If a relatively large air bearing spacing is to be used, which is the case when a large flow of air through the bearing can be permitted, dimensional stability and machining tolerance of the sleeve are not so critical and relatively soft materials such as polyvinyl chloride or phenolic can be used, such materials may absorb a foreign particle in the airbearing region and thereby avoid galling experienced with harder materials of the prior art. When only a small current of air is available requiring close machine tolerances, the sleeve may also be made of a hard material such as anodized aluminum with a surface having a low coefficient of friction as discussed above.

DRAWINGS:

FIG. 1 shows a cross sectional view of the slip ring airbearing of this invention featuring bearing support of the slip ring.

FIG. 2 shows a cross sectional view of the slip ring airbearing of this invention featuring "0" ring support of the slip ring.

FIG. 3 shows a cross sectional view in which the air bearing surfaces are convex toward the axis of the rotor.

FIG. 4 shows a cross sectional view in which the air bearing surfaces are concave toward the axis of the rotor.

Figure 5:
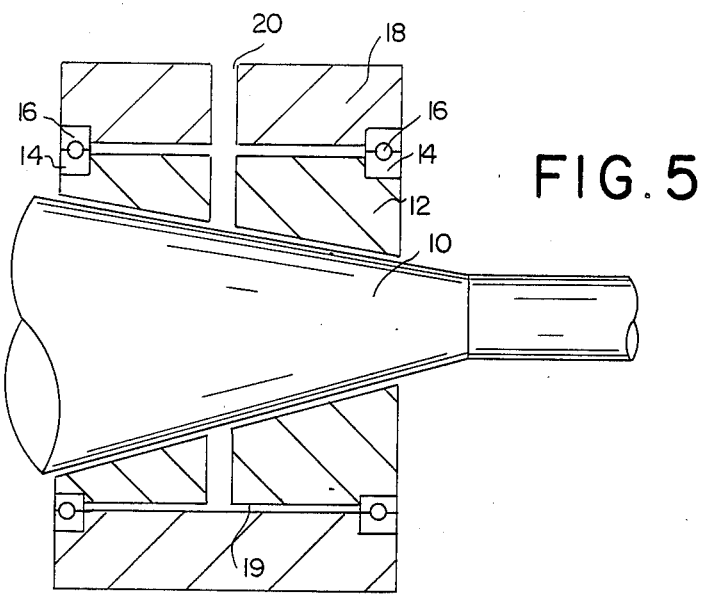
FIG. 5 shows a cross sectional view in which the airbearing surfaces are tapered.

DESCRIPTION OF A PREFERRED EMBODIMENT:

The following detailed description illustrates the invention by way of example, not by way of limitation of the principles of the invention. This description will clearly enable one skilled in the art to make and use the invention, and describes several embodiments, adaptations, variations, alternatives and uses of the invention, including what I presently believe is the best mode of carrying out the invention.

Turning now to a detailed discussion of the drawings, there is shown in FIG. 1 a cross sectional view of the slip ring airbearing of this invention. There is shown a rotor 10. A cylindrical sleeve 12 is positioned concentrically on the rotor 10. The sleeve 12 has a concentric shoulder 14 on each end. A bearing 16 is pressed onto each shoulder 14. The bearings are supported inside a stator 18 (housing enclosing a cylindrical cavity) so as to define an air passage space 19 between the outer surface of the sleeve and the inner surface of the stator. An air passage 20 conducts pressurized air from an air supply (not shown) through the wall of the stator 18 to air space 19. Air then passes from the airspace 19, through a plurality of radial channels 22 in the sleeve to the airbearing area 24 between the surface of the rotor and the inner surface of the sleeve. Grooves (not shown) in the interior surface of the sleeve establish the pattern of pressure and pressure gradients over the surface of the airbearing space. The required distribution of pressure depends on the application of the bearing and comprise, variously, recesses in the vicinity of the entrance of the air passage, grooves extending from the air passage entrance to the edge and around the edge of the airbearing space, etc. The procedure for determining the most effective layout of grooves is well known to those skilled in the art and is thoroughly discussed in the reference cited in the prior art.

Other means of supporting the sleeve may be selected other than a ball bearing. As illustrated in FIG. 2, an "0" ring 26 may be used on each end of the sleeve in place of the bearings and/or the interface between the sleeve and stator housing may be lubricated.

Figure 6:
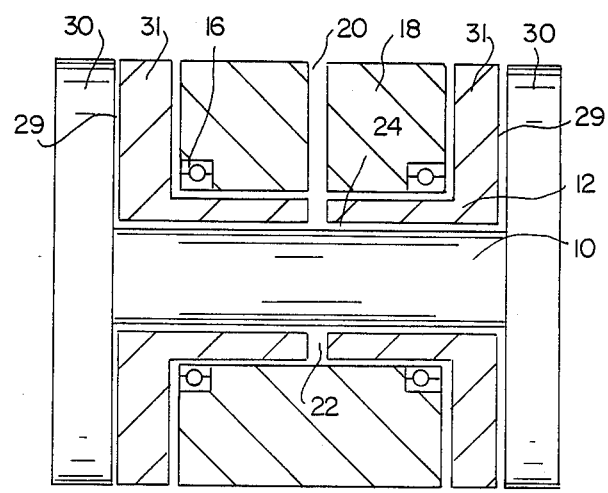
FIG. 6 shows a cross sectional view in which axial support to the rotor is provided by a flange on each end of the rotor.

In FIGS. 3, 4, 5 and 6, constructions are shown which provide axial support to the rotor. In each fig. like numbers identify like parts. In FIG. 3, the airbearing space between the rotor and internal surface of the sleeve is convex toward the axis of the rotor. In FIG. 4, the airbearing space between the rotor and sleeve is concave toward the axis of the rotor. In FIG. 5, the air bearing space between the rotor and sleeve is tapered. In FIG. 6, a flange 4 on each end of the rotor forms an air bearing interface 29 with a surface of a stationary flange 31 on each end of the stator.

A preferred material for construction of the rotor and stator housing is aluminum having a hard anodized surface or steel having a nitrided surface. The material for fabricating the sleeve depends on the end use. For precise positioning of the rotor where the separation of the airbearing surfaces is less than 0.0005", the sleeve may be fabricated from aluminum and have a hard anodized surface. Another choice would be steel having a nitrided surface. If the airbearing space is designed to be large, then the material may be a plastic such as fiber glass filled epoxy.

The embodiments described in the foregoing paragraphs illustrate the means by which the objects of this invention are met. The slip ring construction is effective in avoiding the problem of "crashing" experienced with air bearings of the prior art. The construction is amenable to easy replacement of the sleeve when that is required.

It should be understood that various modifications within the scope of this invention can be made by one of ordinary skill in the art without departing from the spirit thereof. It therefore with my invention to be defined by the scope of the appended claims as broadly as the prior art will permit, and in view of the specification if need be.

I claim:

1. A journal air bearing to support a rotor having an axially symmetric surface, said bearing comprising:
   a sleeve having two ends and an inner and outer surface concentric with said rotor;
   said inner surface defining an air bearing space with said rotor surface;
   a stator having a stator wall which defines a chamber having a surface enclosing said sleeve;
   a ball bearing on each said sleeve end having an outer surface in supporting contact with said chamber surface and an inner surface in supporting contact with said said outer sleeve surface defining a closed space between said chamber surface and said outer sleeve surface;
   said airbearing space supplied by pressurized air from a supply of air through a passage leading from said pressurized air supply, through said stator wall and said sleeve, to said airbearing space.

2. A journal air bearing as in claim 1 wherein said inner sleeve and rotor surfaces are convex with respect to the axis of said rotor to provide both radial and axial support to said rotor.

3. A journal air bearing as in claim 1 wherein said inner sleeve and rotor surfaces are concave with respect to the axis of said rotor to provide both axial and radial support to said rotor.

4. A journal air bearing as in claim 1 wherein said inner sleeve and rotor surfaces are cylindrical.

5. A journal air bearing as in claim 1 wherein said inner sleeve and rotor surfaces are tapered.

6. A journal airbearing as in claim 1 which further comprises a flange attached to each end of said rotor and a flange fixed to each end of said sleeve, all flanges being perpendicular to said rotor axis thereby defining an airbearing space between each said flange attached to said rotor end and each said flange attached to said said sleeve end respectively wherein all said airbearing spaces communicate with said passage supplying pressurized air.

7. A journal airbearing as in claim 1 wherein said sleeve is a plastic.

* * * * *